US008561045B2

(12) United States Patent
Porras et al.

(10) Patent No.: US 8,561,045 B2
(45) Date of Patent: Oct. 15, 2013

(54) CONSTRUCTING RUNTIME STATE FOR INLINED CODE

(75) Inventors: Victor Leonel Hernandez Porras, San Francisco, CA (US); Christopher Arthur Lattner, San Jose, CA (US); Jia-Hong Chen, Cupertino, CA (US); Eric Marshall Christopher, Los Gatos, CA (US); Roger Scott Hoover, Cheyenne, WY (US); Francois Jouaux, Woodside, CA (US); Robert John McCall, San Francisco, CA (US); Thomas John O'Brien, San Jose, CA (US); Pratik Solanki, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 518 days.

(21) Appl. No.: 12/847,904

(22) Filed: Jul. 30, 2010

(65) Prior Publication Data
US 2012/0030659 A1 Feb. 2, 2012

(51) Int. Cl.
*G06F 9/45* (2006.01)
(52) U.S. Cl.
USPC .......................................... 717/159; 717/151
(58) Field of Classification Search
None
See application file for complete search history.

(56) References Cited

U.S. PATENT DOCUMENTS

| | | | |
|---|---|---|---|
| 5,875,334 A * | 2/1999 | Chow et al. ................... | 717/141 |
| 6,195,793 B1 * | 2/2001 | Schmidt ........................ | 717/151 |
| 6,223,340 B1 * | 4/2001 | Detlefs ......................... | 717/145 |
| 6,658,656 B1 | 12/2003 | Thompson | |
| 6,980,997 B1 * | 12/2005 | Peschel-Gallee et al. ............ | 1/1 |
| 7,107,578 B1 * | 9/2006 | Alpern ......................... | 717/124 |
| 7,426,725 B2 * | 9/2008 | Moon et al. .................... | 717/157 |
| 7,921,407 B2 * | 4/2011 | Damron et al. ................ | 717/106 |
| 2005/0071831 A1 | 3/2005 | Sheikh et al. | |
| 2005/0188358 A1 * | 8/2005 | Johnson et al. ................ | 717/129 |
| 2005/0188363 A1 * | 8/2005 | Moon et al. .................... | 717/157 |
| 2007/0055960 A1 * | 3/2007 | Damron et al. ................ | 717/131 |
| 2007/0250825 A1 * | 10/2007 | Hicks et al. .................... | 717/151 |
| 2008/0127134 A1 | 5/2008 | Tirumalai et al. | |
| 2008/0244522 A1 * | 10/2008 | Bernin ......................... | 717/122 |
| 2011/0179403 A1 * | 7/2011 | Lerouge et al. ............... | 717/141 |
| 2011/0225564 A1 * | 9/2011 | Biswas et al. ................. | 717/110 |

OTHER PUBLICATIONS

Stepanian et al., "Inlining Java Native Calls At Runtime," Jun. 2005, ACM, pg. 121-131.*
Ben Asher et al., "The Effect of Unrolling and Inlining for Python Bytecode Optimizations," May 2009.*
Gal et al., "Trace-based Just-in-Time Type Specialization for Dynamic Languages," Jun. 2009, ACM.*
Office Action, U.S. Appl. No. 12/847,925 dated Jan. 29, 2013.

* cited by examiner

*Primary Examiner* — Qing Chen
(74) *Attorney, Agent, or Firm* — Womble Carlyle Sandridge & Rice LLP

(57) ABSTRACT

Techniques for processing computer code are disclosed. In one example, an indication that a computer code is to begin execution at a portion of code other than a starting portion of the code is received, and a runtime state associated with the portion of the code at which execution is to begin is constructed. In some examples, execution of the portion of code is initiated. In some examples, a program counter associated with the portion of the code is used to initiate execution of the code. In some examples, the computer code comprises a fallback code associated with a previously executing code.

27 Claims, 15 Drawing Sheets

US 8,561,045 B2

CONSTRUCTING RUNTIME STATE FOR INLINED CODE

BACKGROUND OF THE INVENTION

Co-pending U.S. patent application Ser. No. 12/847,925 entitled ASSUMPTION-BASED OPTIMIZATION, filed concurrently herewith, the entire disclosure of which is incorporated herein by reference for all purposes, discloses optimizing a compiled code based on an assumption, for example, and testing at runtime to ensure, prior to executing the optimized code, whether the assumption is true. Such a technique may be used, for example, to create a more efficient compiled version of software code written in a dynamic and flexible scripting and/or other programming language, such as Java-Script®.

"Inlining" is a technique that may be used in suitable circumstances to optimize compiled code. The technique typically involves optimizing calls from one function to another by replacing the portion of code that makes a function call with a direct incorporation of the source or compiled code instructions corresponding to the function being called. Inlining a called function avoids the overhead associated with the function being called and a result being returned, for example, and may enable further optimizations of the resulting code to be identified and/or performed. For non-dynamic programming languages, for example, it may be possible and correct to assume that a called function will at runtime not be different than the function as it is defined in source or other code from which instructions associated with the function have been copied, for example to inline the function. However, for a dynamic language, such as JavaScript®, in which a function, operation, or other user or vendor supplied code may be deleted, modified, replaced, etc. at a later time, for example at runtime, it may not necessarily be the case that at runtime a function that has been inlined will be the same as the function as defined at the time the inlining was performed.

BRIEF DESCRIPTION OF THE DRAWINGS

Various embodiments of the invention are disclosed in the following detailed description and the accompanying drawings.

DETAILED DESCRIPTION

Figure 1:
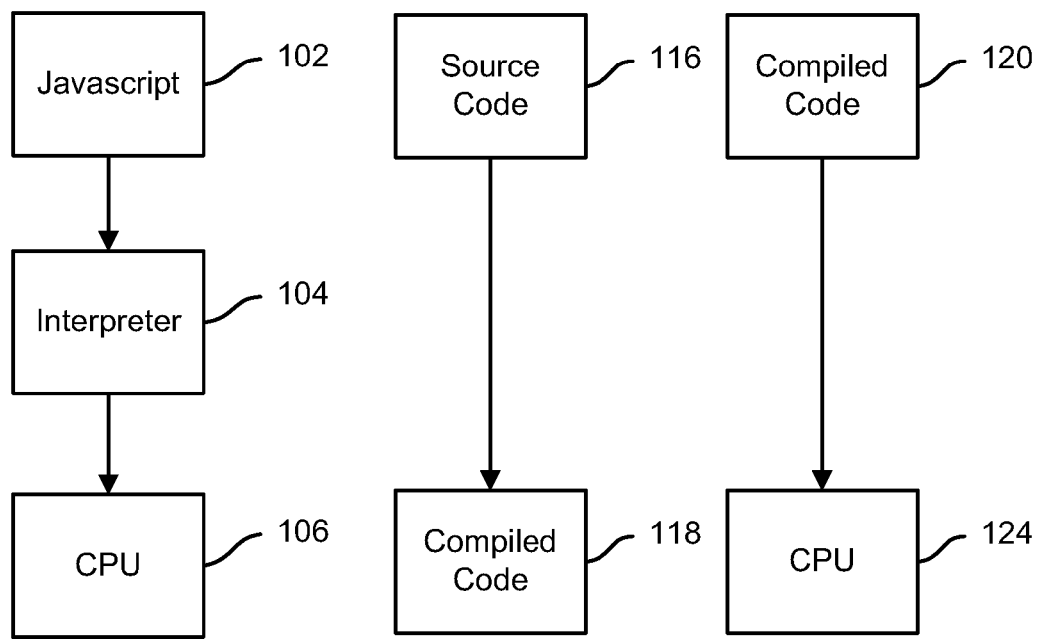
FIG. 1 illustrates an example in which JavaScript® is executed at runtime by an interpreter, an example of source code being compiled into compiled machine code prior to runtime, an example of compiled machine code being provided to a CPU for execution at runtime, and an example of pre-compiled JavaScript® being provided to a CPU for execution at runtime.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Constructing runtime state is disclosed. In the event computer code is to be invoked and executed starting at a point in the code such that a portion of the code to be executed may expect or otherwise require that a runtime or other environment in which the code is running is in a required runtime state, for example a state in which the runtime or other environment would have been in place had a prior portion of the code that was not actually executed had in fact been executed, the required runtime state is constructed. In some embodiments, constructing a runtime state includes constructing all or part of a function stack. For example, if a currently executing and/or invoked portion of code comprises and/or is otherwise associated with a function, a frame associated with the function is added to a function stack. In some embodiments, if a currently executed callee function was or would have been, had the code that is being invoked been executing from a point prior to the point at which execution is to be started) invoked by a caller function, a frame associated with the callee function is added to the function stack. In various embodiments, for each such callee function local variables are instantiated and values appropriate in the runtime context are stored in each such local variable. In some embodiments, once the appropriate state for the callee has been constructed, execution of the code for the callee is started, e.g., based on a program or other counter associated with a starting point at which execution is to begin.

In typical discussion, the function that contains the call may be referred to as the "caller", and the called (and potentially inlined) function may be referred to as the "callee". If the callee in turn calls another function, the original caller may be referred to as the "outermost" function, the ultimate or most-nested callee is referred to as the "innermost" function, and the series of function calls from the outermost to the innermost is referred to as a "call chain". "Code containing inlined functions" is an optimized version of a body of code that has some or all of its function calls inlined to arbitrary depths, with appropriate mechanisms to confirm the validity of the assumptions on which the inlining optimizations are based, and to roll over to alternate code if those assumptions are not met.

In some embodiments, a function stack or other state is constructed to facilitate a roll over from a compiled version of source code in which a callee function has been inlined. A test is performed at runtime to check whether the callee function at that time is the same as the callee function that was used during the inlining optimization of the caller function. If not, a roll over to fallback code, such as original JavaScript® or other source code, is performed, and in connection with such roll over a runtime or other state is constructed, e.g., by constructing all or part of a function stack, to set the runtime or other environment to a state required to support execution of the fallback code, for example a state the environment would have been in had a prior portion of the original source and/or other fallback code been executed.

The following portion of the present disclosure begins with a discussion of assumption-based optimization of software code (part I) and continues with a further discussion of constructing runtime state (part II).

I. Assumption-Based Optimization

Traditionally, computer code written in an interpreted language such as JavaScript® is not executed directly by a computer processor, and instead must be interpreted at runtime by an interpreter, runtime environment, and/or other software entity. An example of such a typical configuration is shown in FIG. 1, specifically JavaScript® 102 is executed at runtime by an interpreter 104 which interprets the JavaScript® instructions and provides corresponding machine code instructions to central processing unit (CPU) 106 for execution. An interpreted language such as JavaScript® has the advantage of being intuitive, flexible, and easy to program, but such languages may be slow to execute since the code needs to be interpreted line by line at runtime before it can be executed.

By contrast, in traditional compiled programming languages, source code typically is compiled into machine code prior to runtime, e.g., source code 116 shown being compiled into compiled code 118 at a time earlier or separate from runtime in FIG. 1. Machine code comprises very low level instructions, which are typically stored in data storage and subsequently executed directly by a processor, e.g., compiled code 120 shown being provided directly to CPU 124 in FIG. 1, with the result that source code that has been compiled to machine code typically executes on a processor more quickly or efficiently than equivalent interpreted code (e.g., JavaScript®), which requires an interpreter at runtime to execute the equivalent machine code on the processor.

More recently, scripts and other code written in interpreted languages such as JavaScript® have been precompiled to machine code executable directly by a processor, e.g., precompiled JavaScript® (i.e., machine code generated prior to runtime based on JavaScript®) 140 shown in FIG. 1 as being provided to CPU 144 for execution at runtime. However, the gains achieved by compiling code written in an interpreted dynamic language such as JavaScript® prior to runtime in the past have been limited by the highly flexible, dynamic, and sometimes unpredictable nature and behavior of code written in such languages. For example, in JavaScript® the variable type of a variable may be dynamically assigned or changed at runtime and, as a result, certain optimizations that could otherwise be performed on a pre-compiled version of such code, for example type-specific optimizations, cannot be performed, resulting in less optimized compiled code.

Figure 2:
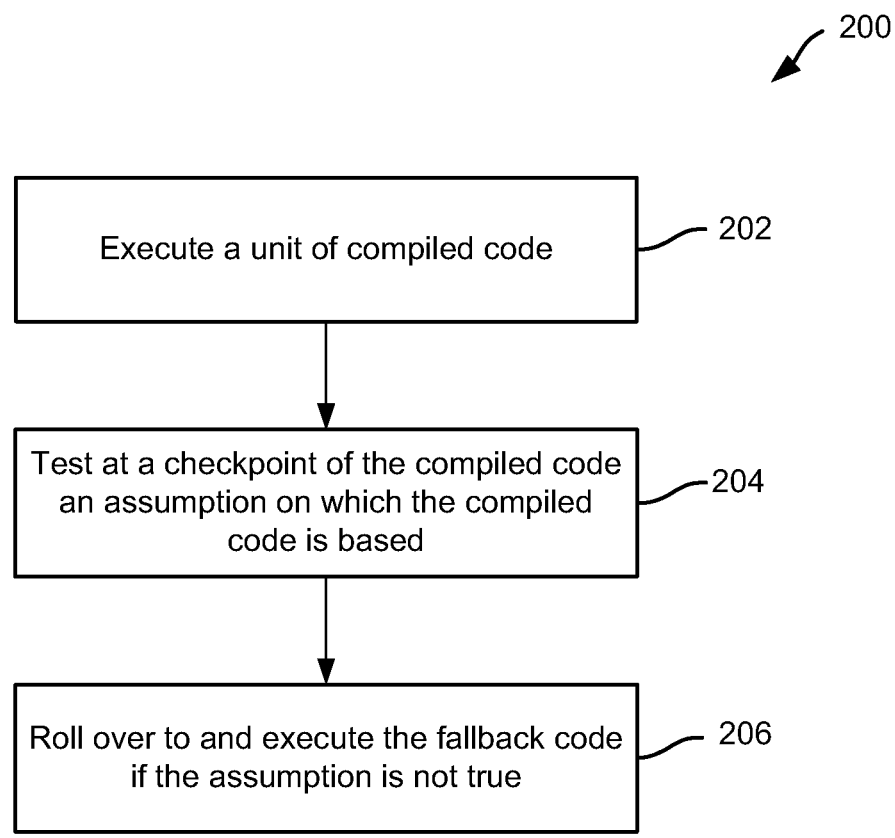
FIG. 2 is a flow diagram illustrating an embodiment of a process for processing source code written in a traditionally interpreted language.

FIG. 2 is a flow diagram illustrating an embodiment of a process 200 for executing software code. In the example shown, a unit of assumption-based compiled code associated with a unit of source code is executed 202. An assumption on which a specific aspect of the assumption-based compiled code is based (e.g., an optimization) is tested at a checkpoint of the compiled code 204. A roll over or transition to fallback code is performed and the fallback code is executed if the test indicates the assumption is not true 206.

In some embodiments, the assumption-based compiled code is low level machine readable code compiled from the source code and is specific to the platform that it is compiled for. The assumption-based compiled code is optimized in some embodiments based on an assumption while the fallback code is not optimized based on this assumption. In some embodiments, the assumption is one of a plurality of assumptions based on which the assumption-based compiled code is optimized. In some embodiments, the assumption is an assumption regarding a variable of the source code. In some embodiments, the assumption is an optimistic assumption of a likely form of the input variable, such as a likely value, type, and/or range of the variable.

In some embodiments, the assumption-based compiled code includes instructions for testing the assumption at the checkpoint, for invoking the fallback code when the assumption is tested not true, and/or for rolling over to the fallback code (e.g., updating the runtime state of the fallback code so that the fallback code can continue correctly from the point where the assumption-based compiled code is rolled over to the fallback code). In some embodiments, the checkpoint is one of a plurality of checkpoints throughout the assumption-based compiled code for testing the assumption and the fallback code is executed when the assumption is tested not true at any one of the checkpoints. In some embodiments, each of the plurality of checkpoints corresponds to a separate unit of fallback code customized to that particular checkpoint. Code execution can continue correctly in the fallback code (from a point corresponding to the particular checkpoint's place in the source code without re-starting the routine) when the assumption is tested to be not true at the particular checkpoint.

In one example, a variable in a unit of source code can be dynamically assigned or changed at runtime to be an integer, float, or string, however based on analysis (e.g., based on dynamic analysis of past runs and/or static analysis of the code), it is determined that the variable may likely be an integer. Consequently, the assumption-based compiled code is optimized by assuming that the variable will be an integer so that the compiled code is simplified and made more efficient in situations where the assumption holds true. However, since the assumption-based compiled code is based on the assumption that the variable is an integer, it may not run correctly and/or efficiently in situations where this assumption does not hold true. In contrast, the fallback code is not based on the assumption and will run correctly when the variable is not an integer, although the fallback code may be less efficient than the assumption-based compiled code when the variable is an integer. The fallback code can be used as a backup for the optimized assumption-based compiled code when the assumption does not hold true.

Figure 3:
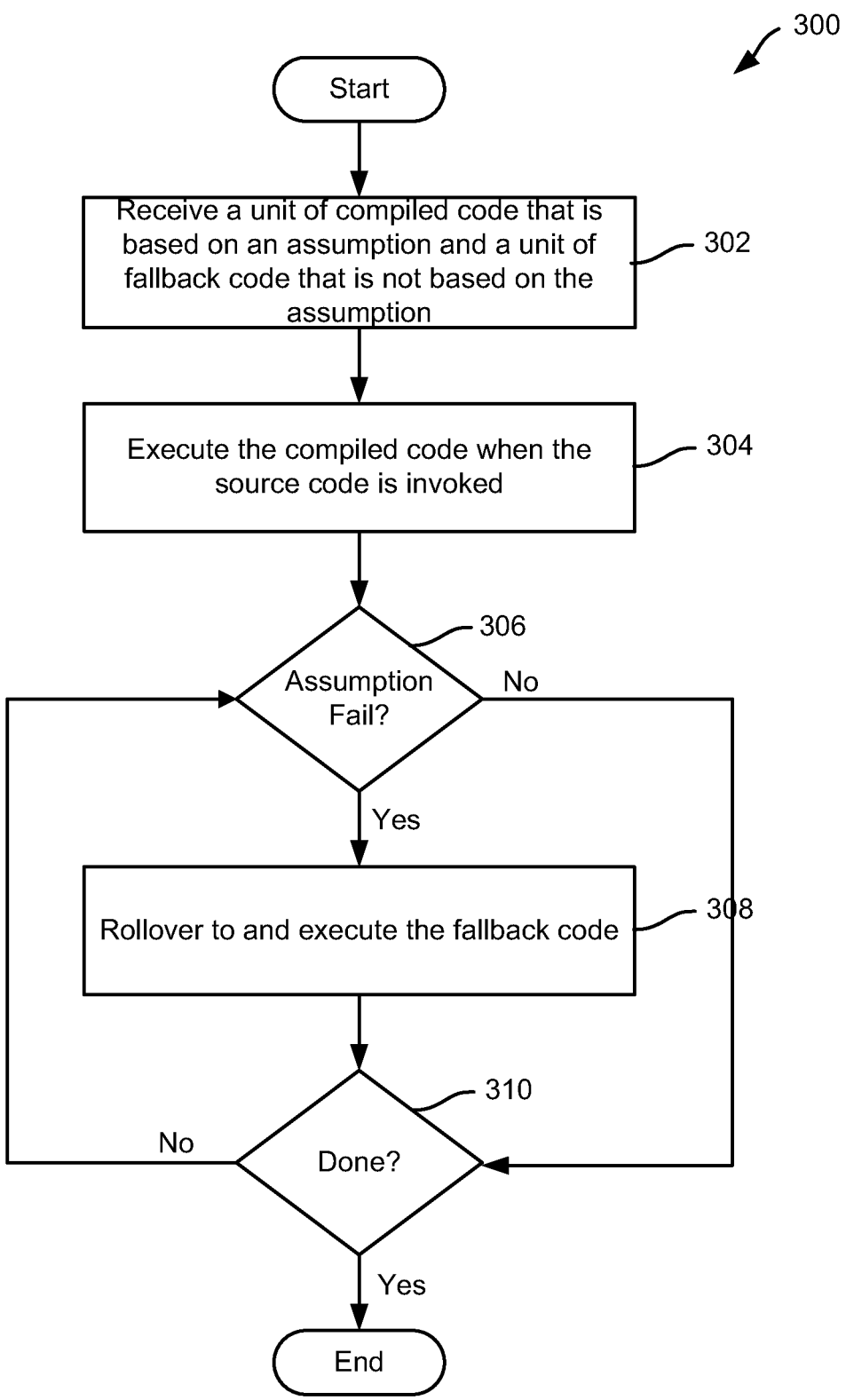
FIG. 3 is a flow diagram illustrating an embodiment of a process for processing source code written in a traditionally interpreted language such as JavaScript®.

FIG. 3 is a flow diagram illustrating an embodiment of a process 300 for executing software code. In the example shown, a unit of assumption-based compiled code associated with a unit of source code and fallback code associated with the source code are received and/or generated locally on a local computing environment 302. The assumption-based compiled code in some embodiments comprises low level machine readable code that is optimized based on an assumption, compiled based on the source code, and is specific to the platform that it is compiled for. In contrast, the fallback code is not optimized based on the assumption. In some embodiments the fallback code is compiled machine code specific to the platform it is compiled for, but is not optimized or otherwise based on the assumption. In some embodiments the fallback code is the original source code which is then interpreted.

The assumption-based compiled form of the source code is executed when the source code is invoked 304. For example when a user browses a webpage and invokes the JavaScript® behind the webpage, a compiled version of the JavaScript® that is optimized based on an assumption is executed. As the assumption-based compiled code is executed, a checkpoint for testing the assumption is encountered and the assumption is tested at the checkpoint 306. For example, the assumption-based compiled code in some embodiments includes checkpoint code configured to test the validity of the assumption, for example at a point in the execution of the assumption-based code that occurs prior to a portion of the code that has been optimized or otherwise based on the assumption. If the assumption is tested to be true at the checkpoint 306, the assumption-based compiled code continues to be executed unless/until the above or in some embodiments another assumption proves false 306 or until execution is done 310. If the assumption is tested to be not true 306, the execution of the assumption-based compiled code is rolled over to the fallback code and the fallback code is executed instead 308. In some embodiments, rollover involves updating the runtime environment of the fallback code so that the fallback code can continue execution correctly from where the assumption-based compiled code stopped, and the system state is as if it has always been executing the fallback code alone, and the assumption-based compiled code had never been executed. In some embodiments, rollover involves rolling back the runtime environment to a saved state of the assumption-based compiled code and then updating the runtime environment of the fallback code with the saved state. In some embodiments, updating the runtime environment of the fallback code involves restoring the local variables and other relevant machine state, which can include but is not limited to register contents, stack state, and memory contents, while leaving the global variables alone. The checkpoint can be located at any appropriate point in the assumption-based compiled code. For example, if a section of the assumption-based compiled code is optimized based on an assumption, checkpoint(s) for the assumption can be placed before or within the section of code, so that the assumption can be tested before the execution of this section of code and/or during the execution of this section of code. Detection and collapsing of redundant checkpoints can be used to further optimize the assumption-based compiled code.

Figure 4:
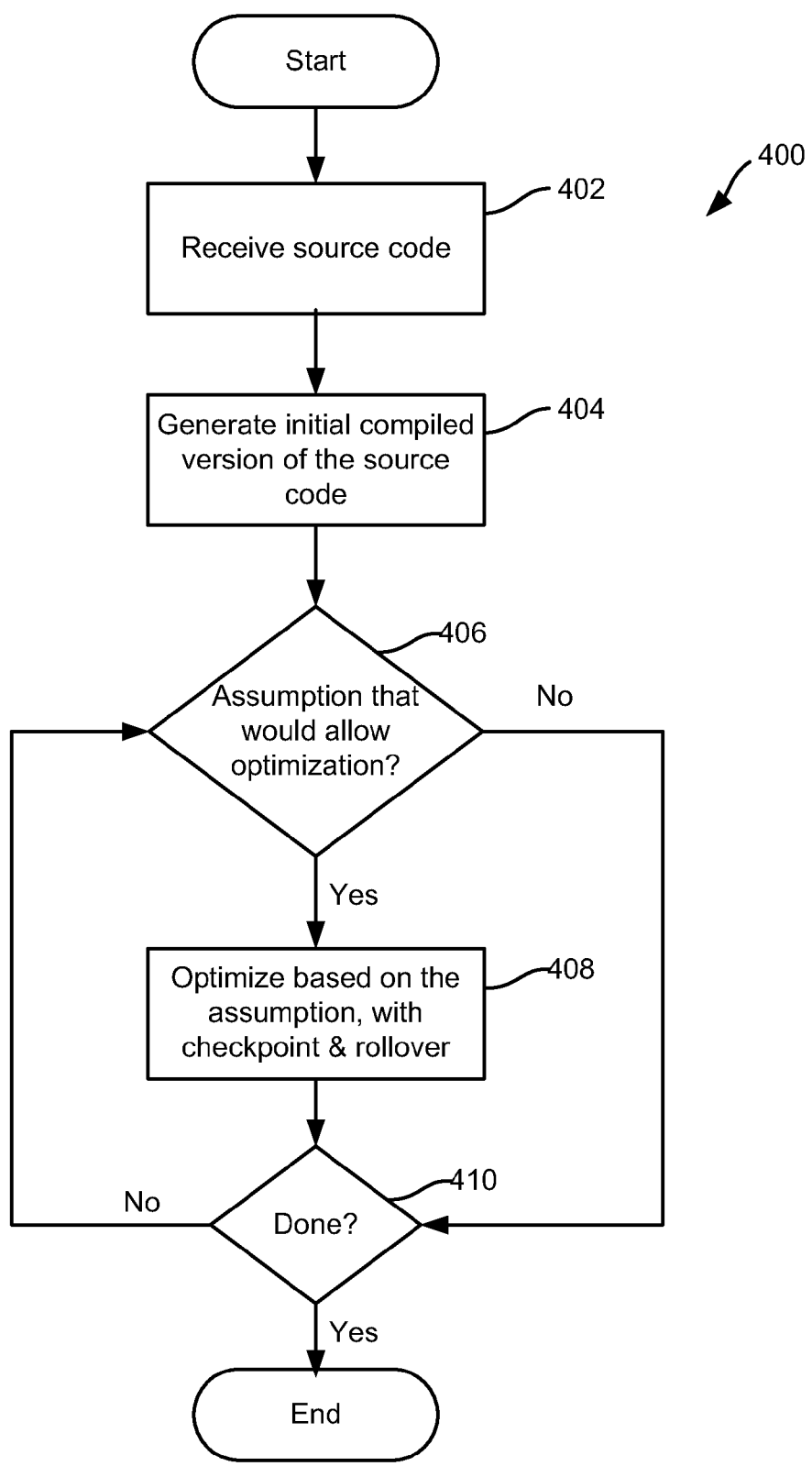
FIG. 4 is a flow diagram of an embodiment of a process for generating compiled code and fallback code, where the compiled code is based on an assumption and the fallback code is not.

FIG. 4 is a flow diagram of an embodiment of a process 400 for generating assumption-based compiled code and fallback code associated with a unit of source code, such as source code written in a traditionally interpreted language such as JavaScript®. In the example shown, source code is received (e.g., downloaded from or uploaded by another device) 402. An initial compiled version of the source code (e.g., compiled machine code specific to a platform and can be directly read by a processor) is generated 404. Analysis, such as static analysis of the source code and/or initial compiled code, and/or dynamic runtime analysis of the source code and/or initial compiled code, is performed to determine whether an assumption can be made that would allow an optimization of the initial compiled version of the source code (e.g., a section of the initial compiled version of the source code) 406. If an assumption based on which the initial compiled version of the source code can be optimized is found, the initial (or other current) compiled version of the source code is optimized based on the assumption to generate an optimized (or further optimized) compiled version of the source code 408. The optimized (or further optimized) compiled version of the source code includes in some embodiments one or more checkpoints for testing the validity of the assumption and for rolling over to fallback code if the assumption is tested not true. The process determines whether further optimization of the compiled version of the source code based on additional assumptions will be performed 406, 410. If yes, the steps 406, 408, and 410 are repeated to perform such further optimization. Analysis of the source and/or initially generated compiled code continues, and opportunities to optimize based on a potentially valid assumption (if any) are taken advantage of, until the entire code has been analyzed and no further opportunities for optimization based on an assumption are found 406, 410, at which time the process of FIG. 4 ends.

Figure 5:
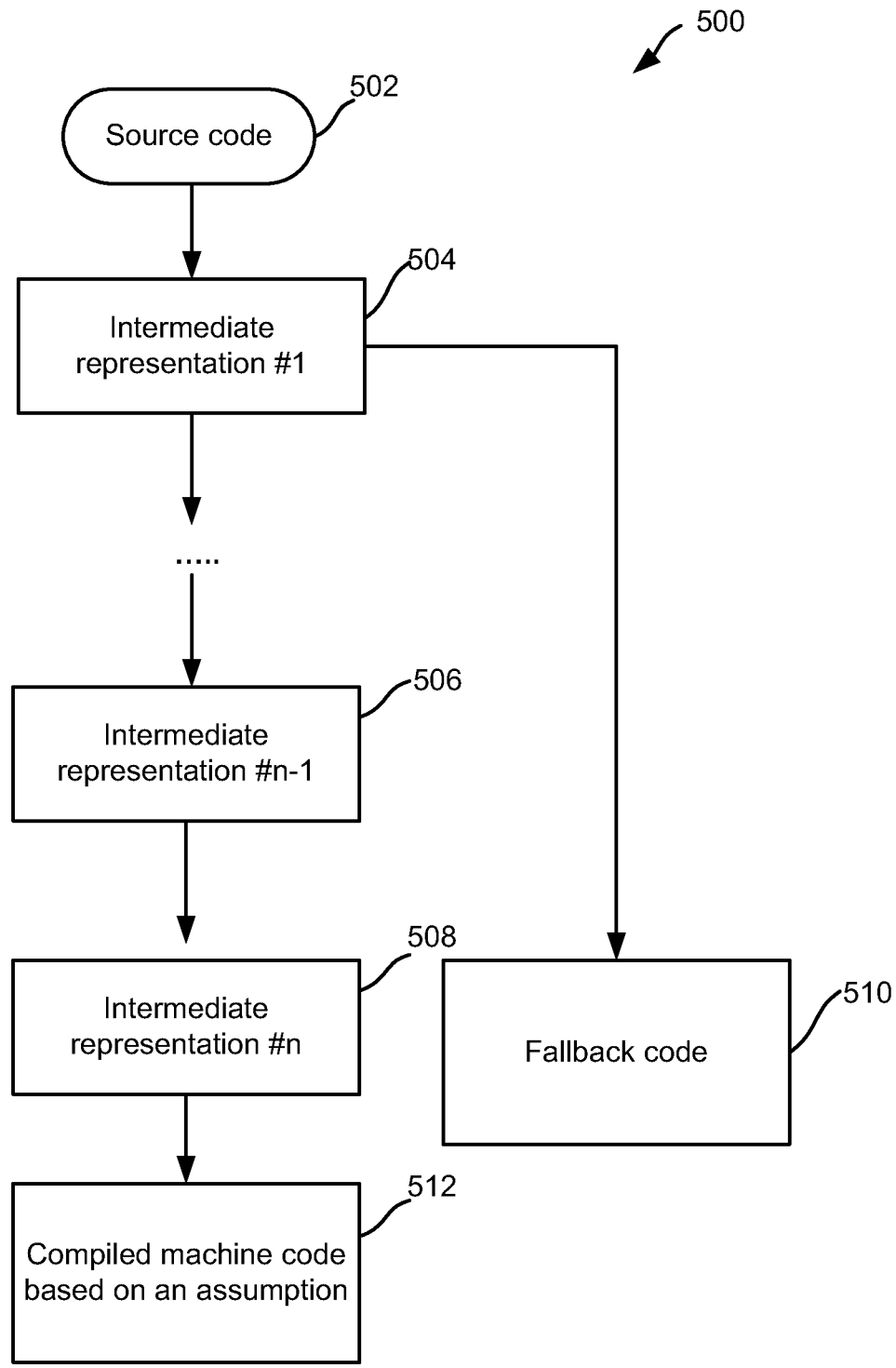
FIG. 5 is a flow diagram of an embodiment of a process for generating compiled code and fallback code, where the compiled code is based on an assumption and the fallback code is not.

FIG. 5 is a flow diagram for an embodiment of a process 500 for generating assumption-based compiled code and fallback code associated with a unit of source code. In the example shown, source code 502 is used to generate an initial intermediate representation 504 of the source code that is not optimized based on an assumption. The intermediate representation 504 in the example shown goes through successive rounds of optimization to generate subsequent intermediate representations represented in FIG. 5 by intermediate representations 506 and 508, the latter of which in this example is used ultimately to generate final assumption-based compiled code 512 that is optimized based on one or more assumptions. In some embodiments, the source code comprises JavaScript® and at least a subset of the intermediate representations shown in FIG. 5 comprise LLVM or other byte code, or another compiled or otherwise derived representation of the original source code. In the example shown, the final intermediate representation is used to generate assumption-based compiled code 512 that is optimized based on one or more assumptions. The initial intermediate representation 504 is used in this example to generate a compiled code that used as fallback code 510 that is not based on an assumption, e.g., one based on which an optimization of the initial intermediate representation 504 is performed to generate a subsequent, optimized intermediate representation. In some embodiments, for each intermediate representation that is optimized based on an assumption, corresponding fallback code is generated based on an intermediate version (e.g., 1 through n in this example) that is not based on that assumption, e.g., an intermediate version as it existed immediately prior to an optimization based on that assumption being performed. In some cases further or subsequent iterations of optimization may be facilitated by an assumption but may not themselves be based on any new assumption, so that not every intermediate representation would have or would require corresponding fallback code. In some embodiments, one or more assumptions may be made without new compiled fallback code being generated, and instead for example the original source code may be used as a fallback code if that particular assumption is found not to be true at runtime. While in the example shown in FIG. 5 multiple iterations of intermediate representation of the source code are generated, in other embodiments compilation may involve more or fewer stages than shown in FIG. 5.

Figure 6:
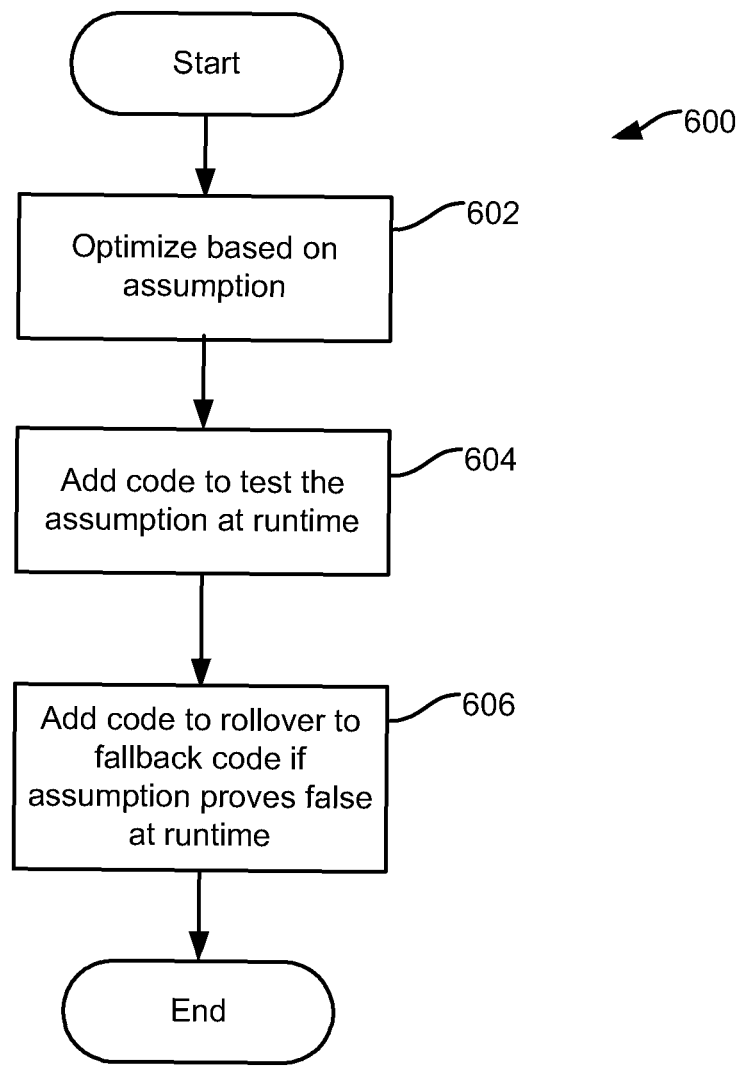
FIG. 6 is a flow diagram illustrating an embodiment of a process for optimizing compiled code based on an assumption.

FIG. 6 is a flow diagram illustrating an embodiment of a process 600 for optimizing compiled code based on an assumption (e.g., the step 408 of FIG. 4). In the example shown, the compiled code associated with the source code is optimized based on an assumption 602. Code for testing the assumption is true is added to the compiled code 604. Code for rolling over to fallback code, if the assumption is found at runtime not to be true, is added to the compiled code 606. In various embodiments, the process 600 is repeated for each assumption that is made.

Figure 7:
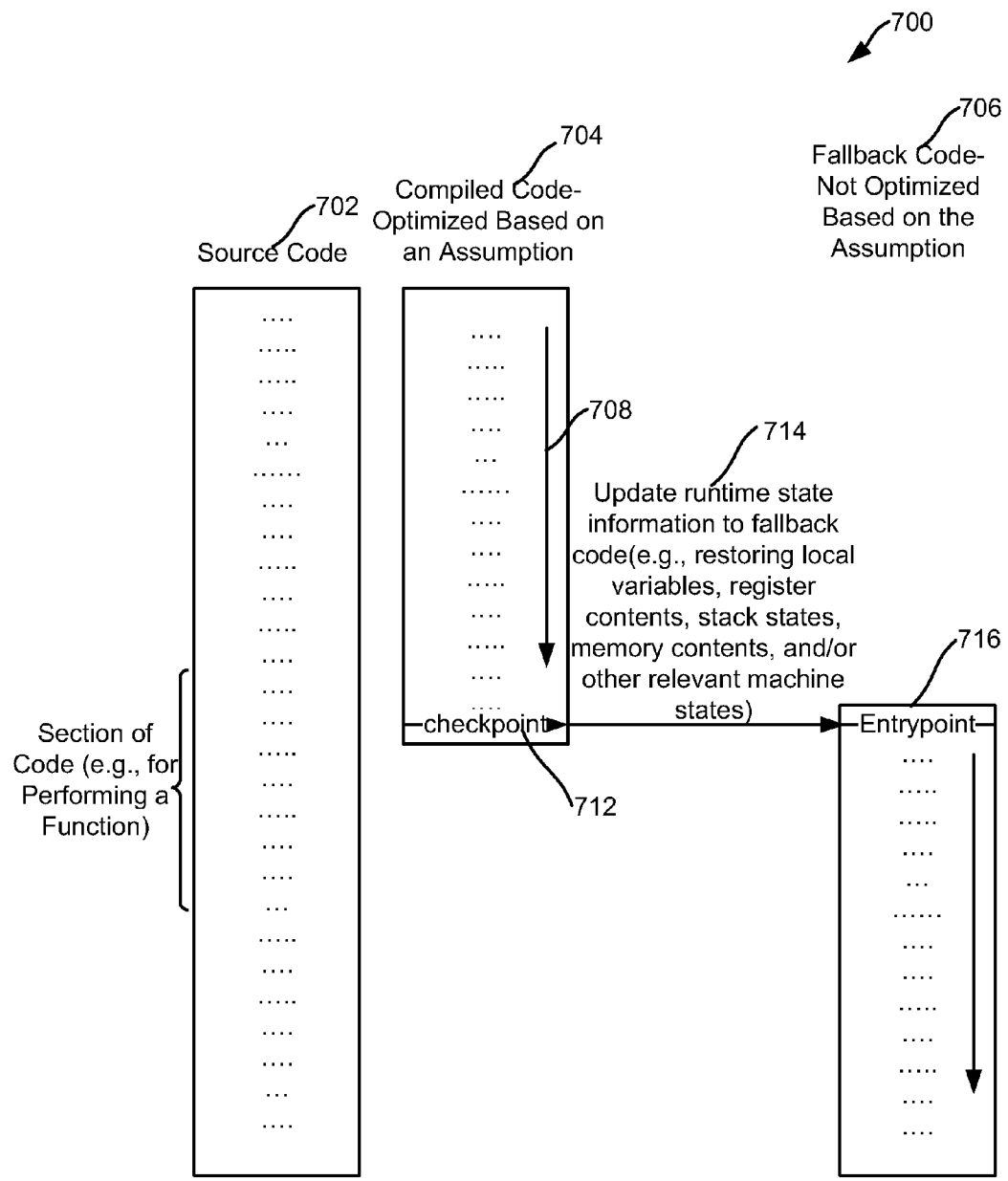
FIG. 7 is a flow diagram illustrating an embodiment of a process for rolling over from compiled code that is optimized based on an assumption to fallback code that is not optimized based on the assumption.

FIG. 7 is flow diagram illustrating an embodiment of a process 700 for rolling over from a unit of assumption-based compiled code to fallback code. In the example shown, assumption-based compiled code 704 associated with a unit of source code 702 is optimized based on an assumption. The compiled code 704 includes code configured to execute a roll over to fallback code 706 that is not optimized based on the assumption, beginning at an associated entry point 716. In the example shown, the fallback code 706 is compiled code of the source code 702 and is not optimized based on the assumption. In the example shown, when the source code 702 is invoked (e.g., when a user browses a webpage containing the source code), the assumption-based compiled code 704 is executed 708. At a checkpoint 712, the assumption is tested. If the assumption is tested true, execution of the assumption-based compiled code 704 continues (not shown in FIG. 7). If the assumption is tested false, rollover code included in the assumption-based compiled code 704 executes a rollover to fallback code 706, which may involve updating a runtime environment associated with the fallback code 706 to a state in which it would have been had the fallback code 706 been executing all along 714. Updating the runtime state may involve restoring local variables, register contents, stack states, memory contents, and/or other relevant machine states, which may be specific to the particular architectures/ABI involved. Execution of the fallback code 706 begins and continues from entry point 716 in the fallback code 706.

Figure 8:
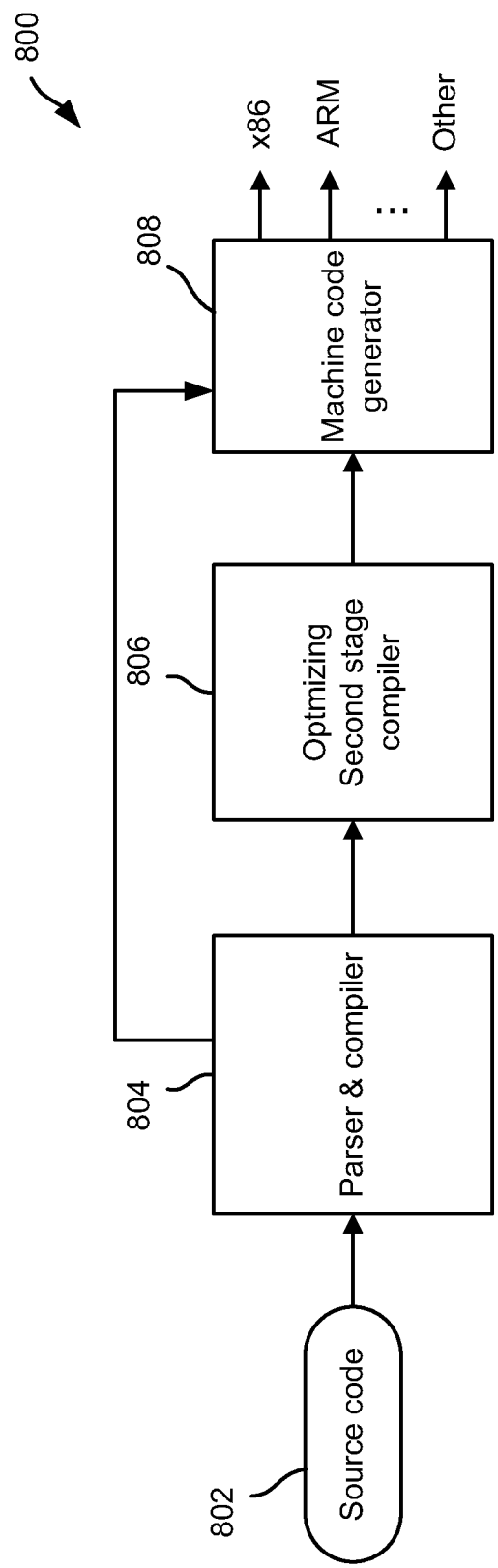
FIG. 8 is a block diagram illustrating an embodiment of a system for processing source code written in a traditionally interpreted language such as JavaScript®.

FIG. 8 is a block diagram illustrating an embodiment of a system 800 for generating compiled code that is based on (e.g., optimized based on) an assumption and fallback code that is not based on the assumption. In the example shown, source code 802 is provided to a parser and initial compiler 804, which parses the source code and generates an initial intermediate representation. In various embodiments, the initial intermediate representation may be bytecode or another derived representation of the original source code. The initial intermediate representation is provided to an optimizing second stage compiler 806, which performs one or more rounds of optimization on the initially generated intermediate representation and provides as output a second intermediate representation of the source code 802, e.g., low level virtual machine (LLVM) or another low level intermediate representation. The optimization may be based on one or more assumptions, for example as discussed above in connection with FIGS. 2 & 3. The system also includes a machine code generator 808 that is configured to use the initial and/or the second (and/or other subsequent) intermediate representations to generate device-specific or computing-platform-specific machine code, e.g., machine code appropriate to processors of the x86, ARM, or other architectures. The generated machine code may be cached in the data storage and made available to each of one or more devices or systems, for example at a subsequent device synchronization time with the one or more devices or systems, machine code appropriate for that device or system. In some embodiments, the machine code generated based on the second intermediate representation and the machine code generated based on the initial intermediate representation are used as the compiled code optimized based on an assumption and the fallback code, respectively, for the processes discussed in reference to FIGS. 2 & 3.

Figure 9:
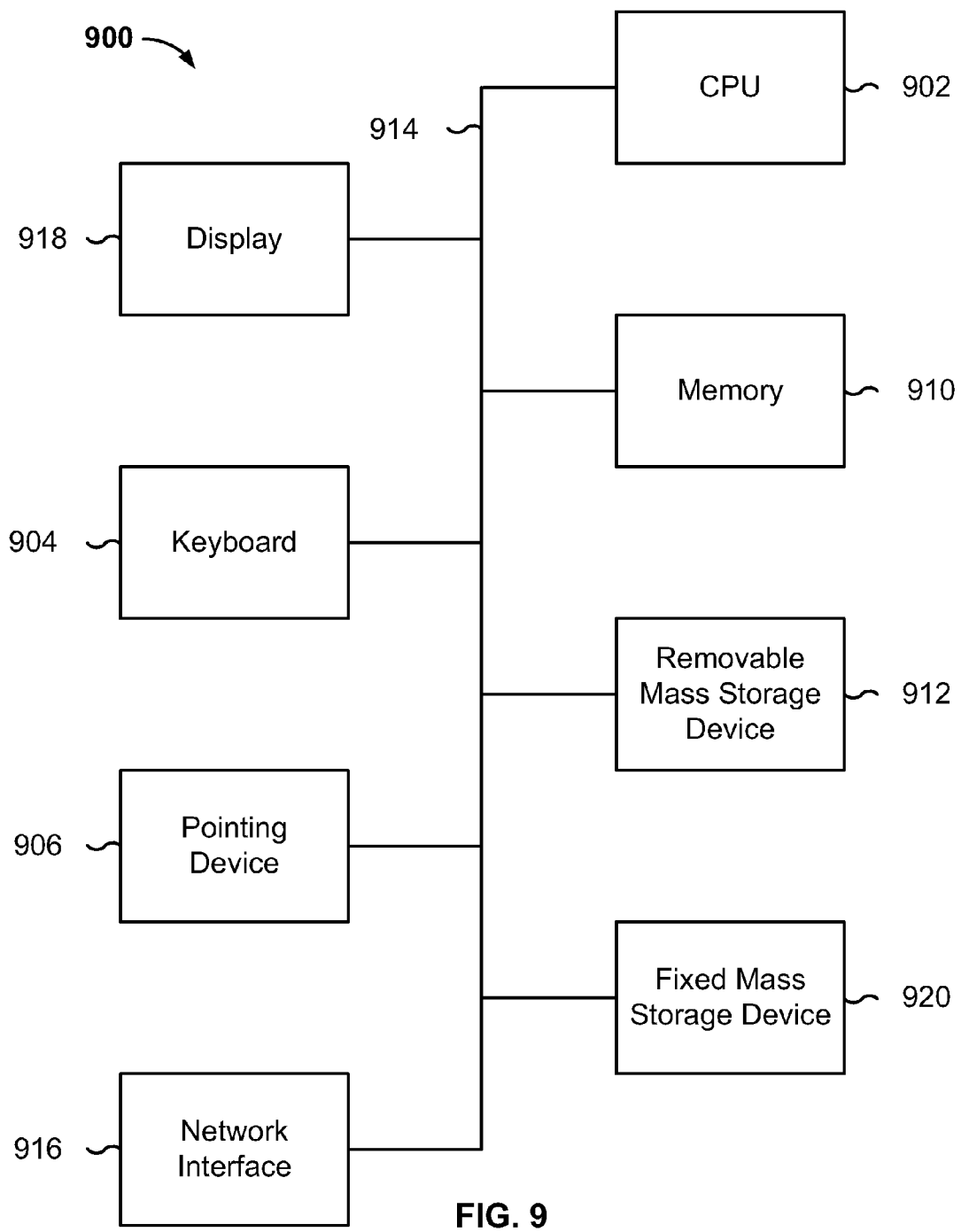
FIG. 9 is a block diagram showing an embodiment of a system for processing source code written in a traditionally interpreted language such as JavaScript®.

FIG. 9 is a block diagram of a computer system 900 used in some embodiments to process software code as described herein. FIG. 9 illustrates one embodiment of a general purpose computer system. Other computer system architectures and configurations can be used for carrying out the processing described herein. Computer system 900, made up of various subsystems described below, includes at least one microprocessor subsystem (also referred to as a central processing unit, or CPU) 902. That is, CPU 902 can be implemented by a single-chip processor or by multiple processors. In some embodiments CPU 902 is a general purpose digital processor which controls the operation of the computer system 900. Using instructions retrieved from memory 910, the CPU 902 controls the reception and manipulation of input data, and the output and display of data on output devices.

CPU 902 is coupled bi-directionally with memory 910 which can include a first primary storage, typically a random access memory (RAM), and a second primary storage area, typically a read-only memory (ROM). A removable mass storage device 912 provides additional data storage capacity for the computer system 900. Storage 912 may also include computer-readable media such as magnetic tape, flash memory, signals embodied on a carrier wave, PC-CARDS, portable mass storage devices, holographic storage devices, and other storage devices. A fixed mass storage 920 can also provide additional data storage capacity. A common example of mass storage 920 is a hard disk drive.

In addition to providing CPU 902 access to storage subsystems, bus 914 can be used to provide access other subsystems and devices as well. In the described embodiment, these can include a display monitor 918, a network interface 916, a keyboard 904, and a pointing device 906, as well as an auxiliary input/output device interface, a sound card, speakers, and other subsystems as needed. The pointing device 906 may be a mouse, stylus, track ball, or tablet, and is useful for interacting with a graphical user interface. The network interface 916 allows CPU 902 to be coupled to another computer, computer network, or telecommunications network using a network connection as shown.

The computer system shown in FIG. 9 is but an example of a computer system suitable to implement techniques described herein. Other computer systems suitable for such use may include additional or fewer subsystems.

Figure 10:
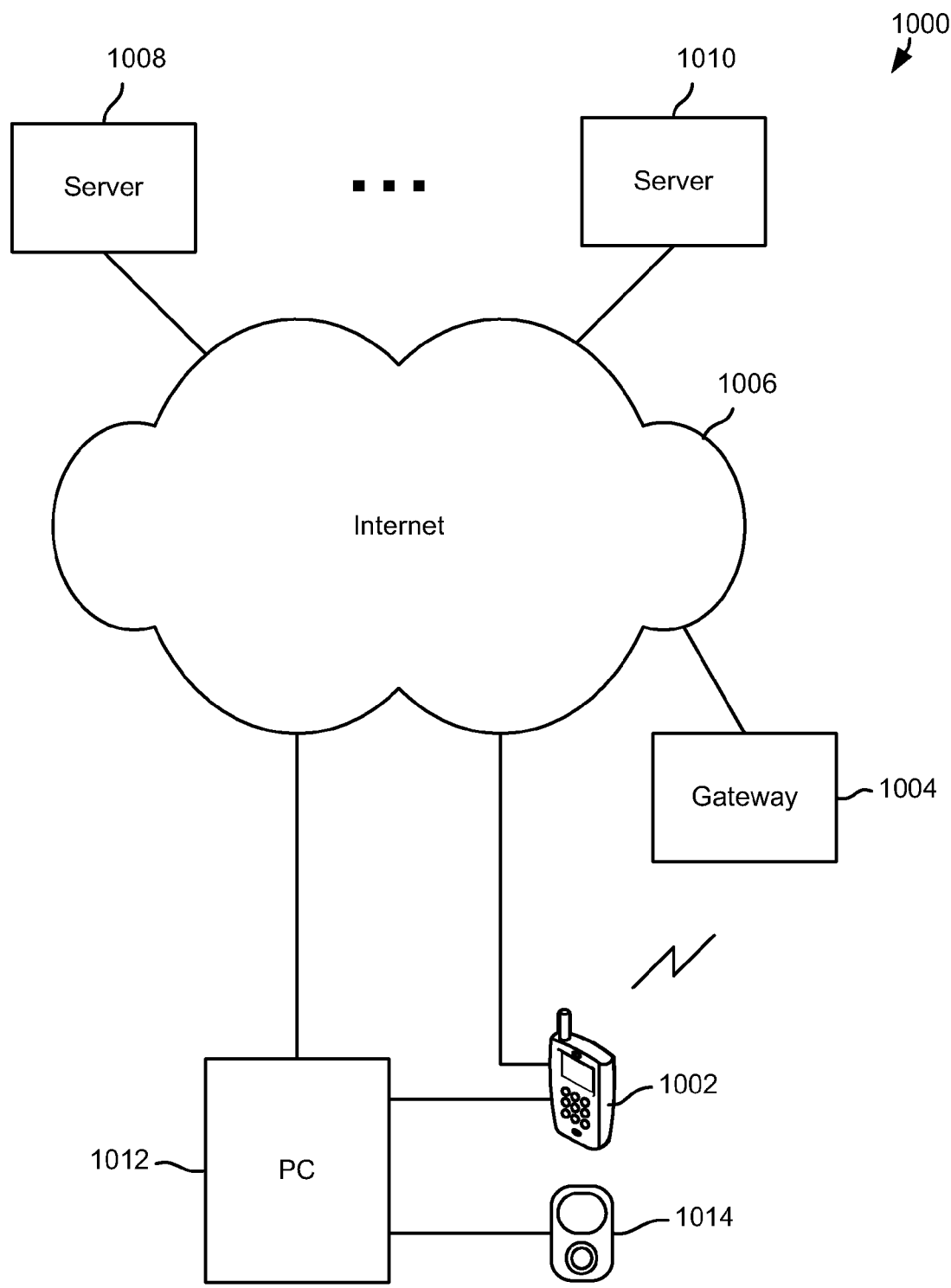
FIG. 10 is a block diagram illustrating an embodiment of a system for processing source code written in a traditionally interpreted language such as JavaScript®.

FIG. 10 is a block diagram illustrating an embodiment of a system for processing a source code written in a traditionally interpreted dynamic language such as JavaScript®. In the example shown, a device 1002 such as a phone, PDA, portable computer, or other device is directly connected up to a network via land wire and/or wirelessly through a gateway 1004 (in various embodiments through one or more other networks, nodes, and/or devices not shown in FIG. 10), and via the network with one or more web or other devices (e.g., server 1008, 1010). In various embodiments, the device 1002 is configured to access web pages, web applications, applets, widgets, or other resources available for download from servers such as servers 1008 and 1010, all or some of which resources may include JavaScript® or other traditionally interpreted code. In various embodiments, the device 1002 is configured to execute various computer codes such as a source code (e.g., a source code written in traditionally interpreted dynamic language such as JavaScript®), a compiled code of a source code (e.g., compiled code that is based on or not based on an assumption), and/or other derived code of the source code such as a device independent intermediate representation of the source code (e.g., intermediate representation). In various embodiments, the device 1002 is configured to in some instances download computer code from another device or system (e.g., server 1008, 1010). In various embodiments, the device 1002 is configured to, upon the initial download of the source code written in interpreted language such as JavaScript®, generate, optimize, and/or cache an intermediate and/or other compile representation of the downloaded source code. In various embodiments, the device is configured to generate, optimize, and/or cache (e.g., prior to runtime or dynamically at runtime) a compiled machine code of the source code that is specific to the computing platform it is generated for and/or which is based on an assumption, as described above. In some embodiments, the device 1002 implements one or more of the processes of FIGS. 2-6. In various embodiments, the device is configured to cache the downloaded or generated code in data storage. In various embodiments, the device 1002 is configured to make the cached computer codes available to other devices (e.g., server 1008, 1010, device 1014, and personal computer 1012) upon synchronization with the one or more devices.

II. Constructing Runtime State

Figure 11:
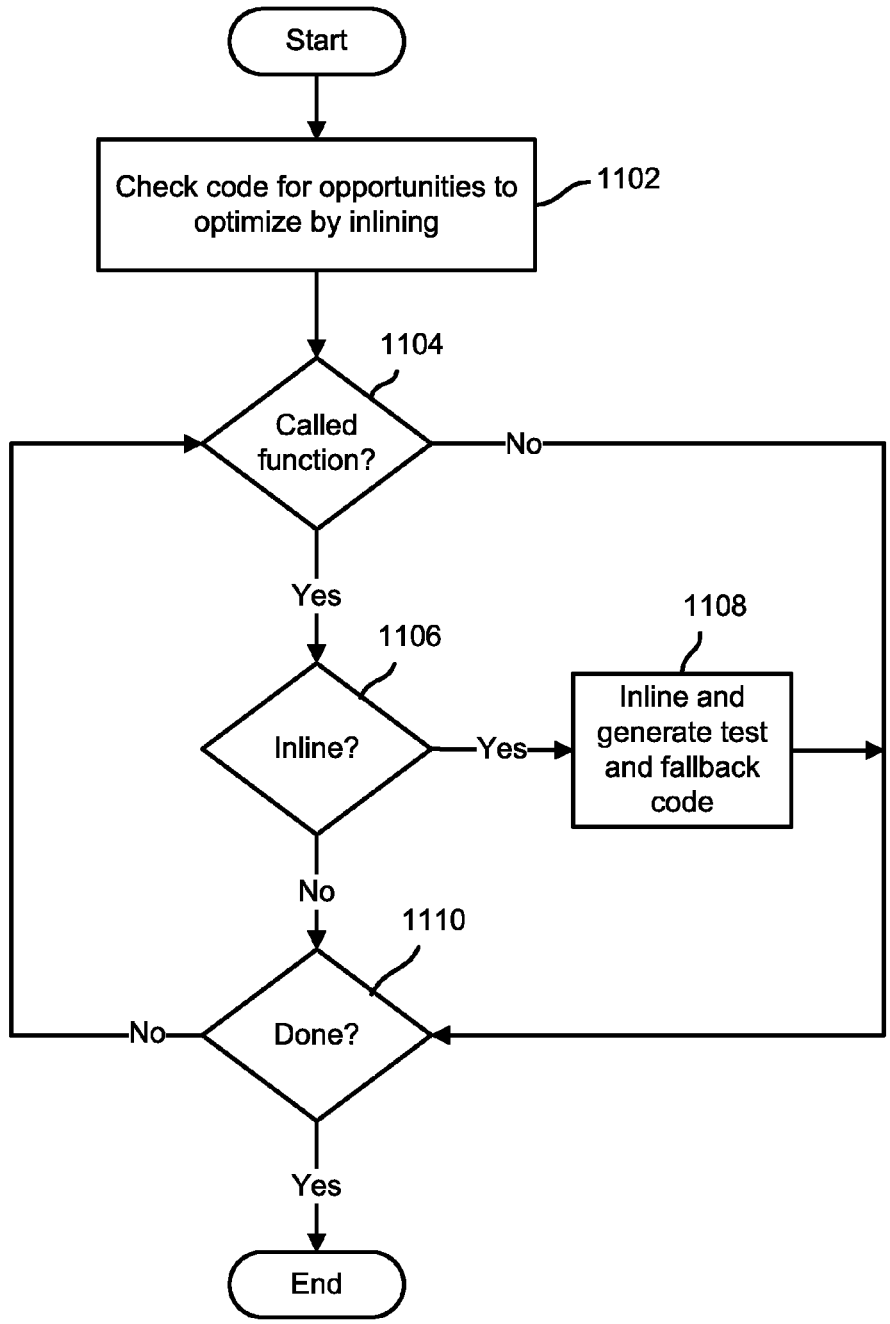
FIG. 11 is a flow chart illustrating an embodiment of a process for processing computer code.

FIG. 11 is a flow chart illustrating an embodiment of process for processing computer code. In the example shown, opportunities to improve the efficiency of the code, e.g., a compiled version of a source code, are sought (1102). For at least certain callee functions (1104), a determination is made as to whether to inline that associated function code (1106). In various embodiments one or more criteria may be used to determine whether a particular callee function should be inlined (1106). In some embodiments, a check is performed to determine whether it would be possible, if necessary, to construct a state associated with the callee function, at runtime, in the event a roll over to fallback code, such as the original source code, is required to be performed at runtime. However, the decision to inline or not can be based on many factors beyond just whether or not the callee state can be recreated. In some embodiments, a callee function is determined to be a candidate for inlining based on static analysis of the source or other code, dynamic analysis such as observation of the source or other code, and/or a combination thereof. For example, in some embodiments, if a callee function as implemented in JavaScript® or other source code is observed, during execution of such code, to always have the same definition (e.g., same local variables and operations), then the callee function is determined to be a candidate for inlining. In some embodiments, if the callee function or related code is such that it would or may not be possible (or practical or efficient) to construct an associated state at runtime, then in some embodiments the callee function is not inlined (1106). If it is determined that the callee function is to be inlined (1106), then the code to check at runtime to determine whether a roll over to fallback code is required and also code to perform such a roll over, if required, are generated, and the callee function code itself is inlined (1108). In various embodiments, the test code checks at runtime to determine whether the actual callee function is at runtime the same as the callee function that was inlined, i.e., that the callee function has not been deleted, replaced, or otherwise modified. In some embodiments, the roll over code includes code configured to construct a runtime or other state, e.g., a function stack, as disclosed herein. For example, code to construct a function stack or portion thereof may be generated. The rollover code may include a program counter or other identifier usable at runtime to invoke and begin execution of the fallback code at a point corresponding to the roll over, such as a callee function that had been inlined into the code containing inlined functions (i.e. the version of the optimized caller from which the roll over is performed) and which at runtime was determined to not be the same as the callee function at the time the inlining decision was made. The process of FIG. 11 continues until all functions that are candidates to be inlined have been processed (1110).

Figure 12:
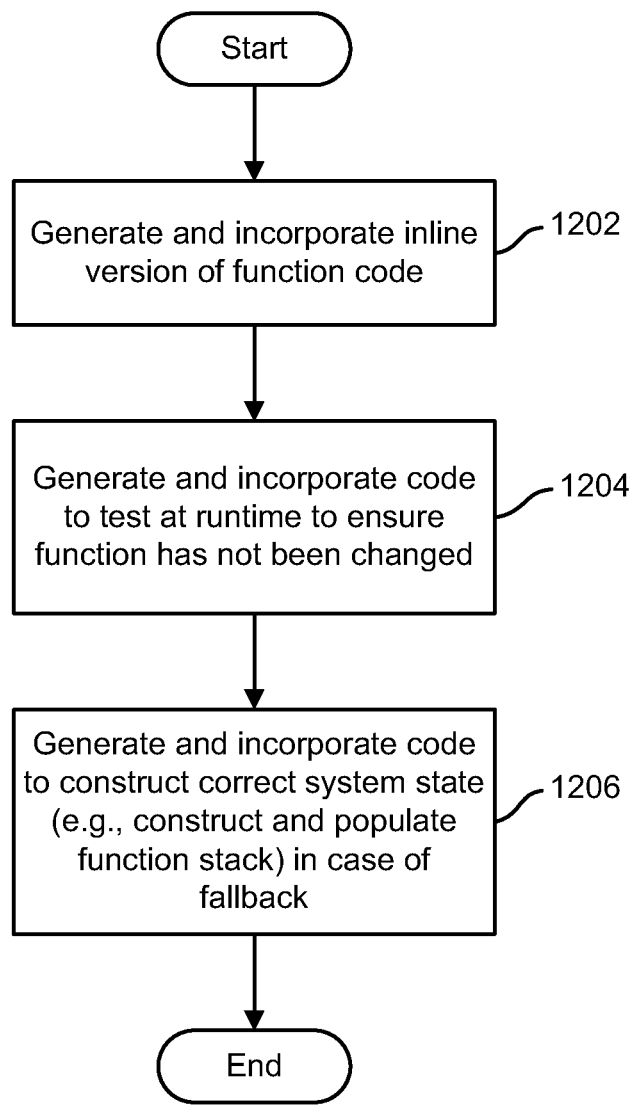
FIG. 12 is a flow diagram illustrating an embodiment of a process for inlining a function.

FIG. 12 is a flow diagram illustrating an embodiment of a process for inlining a function. In some embodiments, the process of FIG. 12 is used to implement at least in part 1108 of FIG. 11. In the example shown, an inline version of the function code for a callee is generated and incorporated (1202) into a portion of code that previously was configured to call the function from a caller function. Code to test at runtime which ensures the callee function as it exists at runtime is the same as the function as it was inlined is generated and incorporated into the version of the code in which the callee function has been inlined (1204). In some embodiments, a hash or other representation of the callee function as inlined is stored and/or incorporated into the version in which the function has been inlined, and a corresponding value is computed and/or compared at runtime to the previously stored value. In some embodiments, a flag or other value is checked at runtime to ensure that the callee function that has been inlined is the same one that is currently being called. If the function is modified, e.g., manually or by other code, the runtime with which it is associated sets the flag or other value to reflect such modification. Code to construct and populate fallback code that reconstructs the correct system state, for example, a function stack, registers, memory contents, and/or other machine state, is generated and incorporated (1206) into the version of the optimized caller code in which the function has been inlined. For example, code to add one or more frames to a function stack and store in each frame zero or more local variables of the corresponding function, is generated and incorporated. In some embodiments, to support inlining to arbitrary call chain depths, the code to construct state includes instructions to iteratively add frames to the function stack, and for each frame to initialize and store appropriate values into local variables of that callee function, for any arbitrary depth of nested function calls or call chain.

For example, if in the original source code a caller function f( ) calls a callee function a( ) which in turn calls a callee function b( ) then roll over code is inserted into the optimized version of caller function f( ). The rollover code is configured to perform a roll over to fallback code in the event the inlined callee function b( ) is determined at runtime to be different than the function b( ) as inlined into the currently executing optimized code (e.g., a compiled version of a source or other code) when the inlining operation was done, then code to roll over to fallback code would include instructions that, for example, in a stack-based execution architecture, would iteratively add frames for functions b( ), a( ), and f( ), respectively, to the function stack, and for each to store in its corresponding frame zero or more local variables of each corresponding function with their correctly-determined values as of the time of the rollover. In various embodiments, a mapping between variables and/or other values generated or used at runtime, or derived from such generated and/or used variables, by code in which a function has been inlined, e.g., a compiled version of a source code, is used at rollover time to determine what values to store into local variables in the function stack as constructed in connection with a roll over to fallback code. In some embodiments the mapping and/or values are hardcoded into the code of the caller function in which the callee function has been inlined. In some embodiments, values that would be required to construct runtime state in the event of a roll over to fallback code and/or the local variables of the fall back code to which they map are stored in the course of execution of the caller function's code in which the callee function has been inlined, and upon roll over to the fallback code values and/or the mapping are read from the location in which they have been stored and used to construct the updated runtime state.

Figure 13:
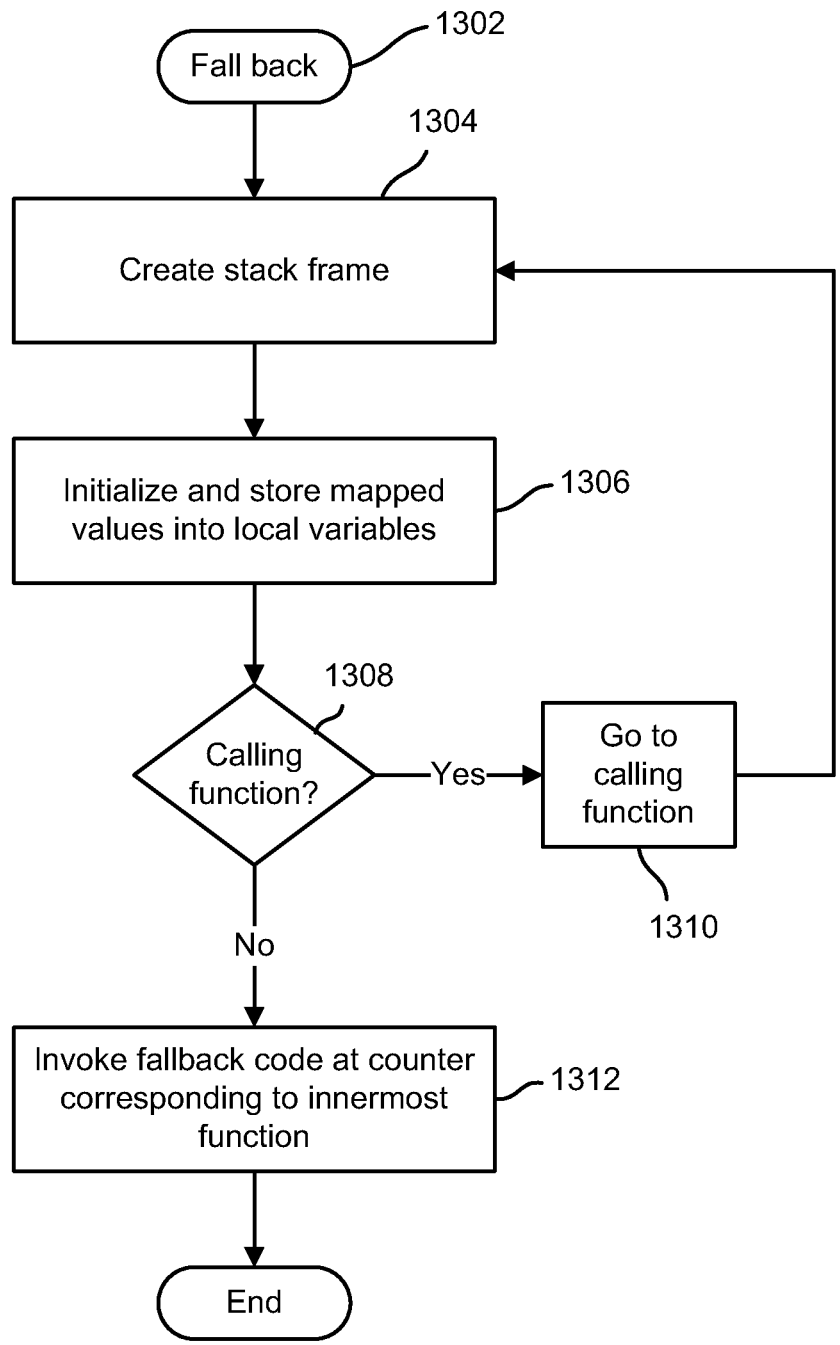
FIG. 13 is a flow diagram illustrating an embodiment of a process for constructing runtime state in a stack-based execution architecture.

FIG. 13 is a flow diagram illustrating an embodiment of a process for constructing runtime state in a stack-based execution architecture. In the example shown, upon receiving an indication to roll over to fall back code (1302), a frame is added to the function stack, initially for a callee function with which a portion of the code that has prompted the roll over is associated (1304). Local variables of the callee function (if any) are initialized and corresponding values are stored into such local variables (1306). If the function for which a frame has been added and local variables stored (1304 and 1306) was not the outermost caller function in the original source (or other pre-inlined) code (1308), then 1304, 1306, and 1308 are repeated for the current function's caller function (1310), until all functions in the call chain have been processed including the outermost caller function (1308). Once the function stack has been constructed, the fall back code is invoked and executed beginning from a point associated with the function that was inlined in the code from which the roll over is performed, i.e., the innermost function of the call chain (1312). In some embodiments, a program counter associated with the callee function is used to begin execution of the fall back code from the correct point.

Figure 14:
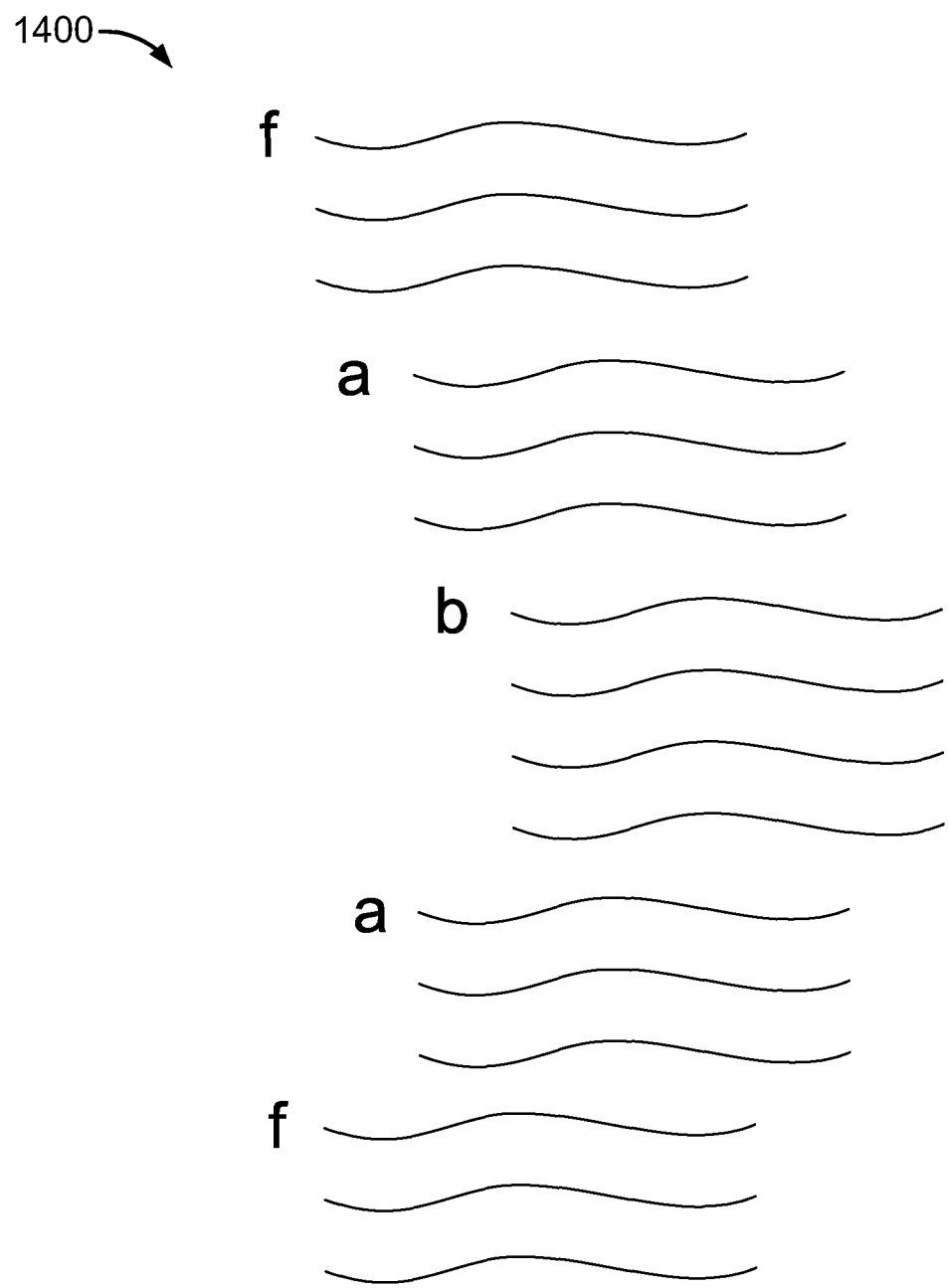
FIG. 14 illustrates an embodiment of compiled code into which nested callee functions have been inlined into an outermost caller function.

FIG. 14 illustrates an embodiment of compiled code into which nested callee functions have been inlined into an outermost caller function. In the example shown, in the compiled code 1400 a callee function a( ) called by a caller function f( ) has been inlined, i.e., associated instructions incorporated directly into the code for caller function f( ), eliminating the need to call a separate function and wait for a result to be returned. Likewise, a nested callee function b( ) called by the function a( ), for example in original source code of which the code 1400 is a compiled version, has been inlined by being incorporated into a portion of the code 1400 associated with function a( ), as shown. In various embodiments, the code 1400 would include at appropriate points code to test at runtime whether function code for function a( ) and/or b( ), as applicable, is the same as the corresponding function as inlined, and also code configured to construct a corresponding state and perform a roll over to fallback code, beginning execution of such fallback code at an appropriate point, in the event it is determined at runtime that such a roll over is required. In the example shown, if it is determined at runtime that the function a( ) as found at runtime is not the same as the function a( ) as inlined, then the associated code to construct state would create and populate stack frames for functions a( ) and f( ), and then invoke the original source code at a point associated with function a( ). If, instead, the determination at runtime is made that function a( ) is the same as inlined, but the function b( ) is determined not to be the same as inlined, then associated rollover code would construct a frame stack that includes frames for functions f( ), a( ), and b( ), and would cause the fallback code to begin executing at a point associated with function b( ).

Figure 15:
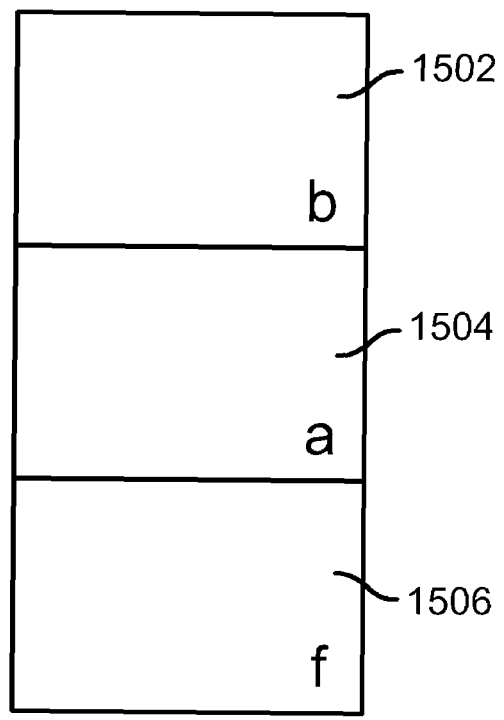
FIG. 15 is a block diagram illustrating an embodiment of a constructed function stack.

FIG. 15 is a block diagram illustrating an embodiment of a constructed function stack. In the example shown, the function stack 1500 has been constructed to include frames 1502, 1504, and 1506, for functions b( ), a( ), and f( ), respectively, as in the example discussed immediately above.

While a number of embodiments described herein relate to rolling over to fall back code in the event an inlined function is determined at runtime not to be the same as the function as inlined, techniques disclosed herein may be used to construct runtime or other state in circumstances of roll over to fallback or other code for other reasons and/or in other contexts as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving, during execution of a first code, an indication that a roll over from executing the first code to executing a second code is required, wherein the second code acts as a fallback code to the first code, and wherein the fallback code is associated with the first code;
   determining, prior to execution of the second code, that the second code is to begin execution at a portion of the second code other than a starting portion of the second code;
   constructing a runtime state for the second code, including constructing at least a portion of a function stack that includes at least one value that would have been generated had the second code been executed at the starting portion of the second code; and
   initiating execution of the portion of the second code other than the starting portion of the second code.

2. The method of claim 1, wherein a program counter associated with the second code is used to initiate execution of the portion of the second code other than the starting portion of the second code.

3. The method of claim 1, wherein the indication comprises an indication that an assumption on which the first code is based is not true.

4. The method of claim 1, wherein the indication comprises an indication that a function that was inlined in the first code has been determined to be different at runtime than the function as inlined in the first code.

5. The method of claim 1, wherein the second code comprises a source code and the first code comprises a compiled version of the source code.

6. The method of claim 1, wherein constructing the at least a portion of the function stack includes adding a frame to the function stack.

7. The method of claim 1, wherein constructing the at least a portion of the function stack includes storing a local variable in a frame of the function stack.

8. The method of claim 1, wherein constructing the at least a portion of the function stack includes mapping a runtime value associated with the first code to a local variable associated with the portion of the second code other than the starting portion of the second code that is to begin execution.

9. The method of claim 1, wherein constructing the at least a portion of the function stack includes iteratively adding a stack frame and storing zero or more local variables and arguments for each function in a function call chain of arbitrary depth.

10. A system, comprising:
a memory; and
a processor coupled to the memory and configured to:
receive, during execution of a first code, an indication that a roll over from executing the first code to executing a second code is required, wherein the second code acts as a fallback code to the first code, and wherein the fallback code is associated with the first code;
determine, prior to execution of the second code, that the second code is to begin execution at a portion of the second code other than a starting portion of the second code;
construct a runtime state for the second code, including constructing at least a portion of a function stack that includes at least one value that would have been generated had the second code been executed at the starting portion of the second code; and
initiate execution of the portion of the second code other than the starting portion of the second code.

11. The system of claim 10, wherein a program counter associated with the second code is used to initiate execution of the portion of the second code other than the starting portion of the second code.

12. The system of claim 10, wherein the indication comprises an indication that an assumption on which the first code is based is not true.

13. The system of claim 10, wherein the indication comprises an indication that a function that was inlined in the first code has been determined to be different at runtime than the function as inlined in the first code.

14. The system of claim 10, wherein the second code comprises a source code and the first code comprises a compiled version of the source code.

15. The system of claim 10, wherein constructing the at least a portion of the function stack includes adding a frame to the function stack.

16. The system of claim 10, wherein constructing the at least a portion of the function stack includes storing a local variable in a frame of the function stack.

17. The system of claim 10, wherein constructing the at least a portion of the function stack includes mapping a runtime value associated with the first code to a local variable associated with the portion of the second code other than the starting portion of the second code that is to begin execution.

18. The system of claim 10, wherein constructing the at least a portion of the function stack includes iteratively adding a stack frame and storing zero or more local variables and arguments for each function in a function call chain of arbitrary depth.

19. A computer program product for processing code, the computer program product being embodied in a non-transitory computer readable storage medium and comprising computer instructions executable to:
receive, during execution of a first code, an indication that a roll over from executing the first code to executing a second code is required, wherein the second code acts as a fallback code to the first code, and wherein the fallback code is associated with the first code;
determine, prior to execution of the second code, that the second code is to begin execution at a portion of the second code other than a starting portion of the second code;
construct a runtime state for the second code, including constructing at least a portion of a function stack that includes at least one value that would have been generated had the second code been executed at the starting portion of the second code; and
initiate execution of the portion of the second code other than the starting portion of the second code.

20. The computer program product of claim 19, wherein a program counter associated with the second code is used to initiate execution of the portion of the second code other than the starting portion of the second code.

21. The computer program product of claim 19, wherein the indication comprises an indication that an assumption on which the first code is based is not true.

22. The computer program product of claim 19, wherein the indication comprises an indication that a function that was inlined in the first code has been determined to be different at runtime than the function as inlined in the first code.

23. The computer program product of claim 19, wherein the second code comprises a source code and the first code comprises a compiled version of the source code.

24. The computer program product of claim 19, wherein constructing the at least a portion of the function stack includes adding a frame to the function stack.

25. The computer program product of claim 19, wherein constructing the at least a portion of the function stack includes storing a local variable in a frame of the function stack.

26. The computer program product of claim 19, wherein constructing the at least a portion of the function stack includes mapping a runtime value associated with the first code to a local variable associated with the portion of the second code other than the starting portion of the second code that is to begin execution.

27. The computer program product of claim 19, wherein constructing the at least a portion of the function stack includes iteratively adding a stack frame and storing zero or more local variables and arguments for each function in a function call chain of arbitrary depth.

* * * * *